(12) United States Patent
Hurd et al.

(10) Patent No.: US 9,185,231 B2
(45) Date of Patent: Nov. 10, 2015

(54) VENDOR NEUTRAL VOIP INTERFACE DEVICES AND COMPATIBLE PORTABLE PHONES

(75) Inventors: Preston Hurd, Livermore, CA (US); Mohinder Gill, Danville, CA (US)

(73) Assignee: Preston Hurd, Lafayette, CA (US)

( * ) Notice: Subject to any disclaimer, the term of this patent is extended or adjusted under 35 U.S.C. 154(b) by 0 days.

(21) Appl. No.: 13/230,649

(22) Filed: Sep. 12, 2011

(65) Prior Publication Data

US 2012/0063432 A1    Mar. 15, 2012

Related U.S. Application Data

(60) Provisional application No. 61/403,139, filed on Sep. 10, 2010, provisional application No. 61/444,640, filed on Feb. 18, 2011.

(51) Int. Cl.
| | | |
|---|---|---|
| *H04W 4/00* | (2009.01) | |
| *H04M 7/00* | (2006.01) | |
| *H04M 3/42* | (2006.01) | |
| *H04M 7/12* | (2006.01) | |

(52) U.S. Cl.
CPC .......... *H04M 7/006* (2013.01); *H04M 3/42289* (2013.01); *H04M 7/1205* (2013.01)

(58) Field of Classification Search
USPC ....................................................... 370/338
See application file for complete search history.

(56) References Cited

U.S. PATENT DOCUMENTS

| 6,826,174 B1 * | 11/2004 | Erekson et al. ............... 370/352 |
|---|---|---|
| 2004/0114581 A1 | 6/2004 | Hans et al. |
| 2005/0066069 A1 * | 3/2005 | Kaji .................................. 710/1 |
| 2005/0129026 A1 * | 6/2005 | Chang et al. ............... 370/395.2 |
| 2007/0138999 A1 * | 6/2007 | Lee et al. ...................... 320/107 |
| 2007/0203981 A1 * | 8/2007 | Takano et al. ................ 709/204 |
| 2007/0237131 A1 | 10/2007 | Milstein et al. |
| 2008/0084870 A1 * | 4/2008 | Taylor et al. .................. 370/352 |
| 2008/0188180 A1 * | 8/2008 | Rahja ........................... 455/41.2 |
| 2009/0141708 A1 * | 6/2009 | Rodriguez et al. ........... 370/352 |
| 2010/0002680 A1 | 1/2010 | Petricoin, Jr. |

(Continued)

OTHER PUBLICATIONS

RFC: 3261 SIP: Session Initiation Protocol J. Rosenberg, H. Schulzrinne, G. Camarillo, A. Johnston, J. Peterson, R. Sparks, M. Handley, E. Schooler Jun. 2002.*

(Continued)

*Primary Examiner* — Huy D Vu
*Assistant Examiner* — Kevin Cunningham

(57) ABSTRACT

A Voice over Internet Protocol (VoIP) interface system for enabling communications between a plain old telephone service (POTS) device and a packet data network is disclosed. The VoIP interface system includes a POTS interface configured to communicate POTS voice telephone communications and a powered packet-based interface configured to communicate packet-based voice telephone communications with a host computer system that also provides power. The VoIP interface system also includes a memory system that includes a set of instructions, that direct the host system to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information when executed.

2 Claims, 14 Drawing Sheets

(56) References Cited

U.S. PATENT DOCUMENTS

2010/0034270 A1* 2/2010 Nagaraj et al. ........... 375/240.16
2011/0131335 A1* 6/2011 Spaltro et al. ................ 709/228

OTHER PUBLICATIONS

International Application No. PCT/US2011/051259, International Search Report and Written Opinion, 10 pages, Feb. 28, 2012.

* cited by examiner

VENDOR NEUTRAL VOIP INTERFACE DEVICES AND COMPATIBLE PORTABLE PHONES

CLAIM OF PRIORITY

This application claims priority to U.S. Provisional Patent Application No. 61/403,139 entitled "MINI-JACK PORTABLE PHONE," which was filed on Sep. 10, 2010, and U.S. Provisional Patent Application No. 61/444,640 entitled "UNIVERSAL, VENDER NEUTRAL VOIP DEVICE," which was filed on Feb. 18, 2011, the contents of which are expressly incorporated by reference herein.

TECHNICAL FIELD

The present disclosure relates to the field of voice over Internet protocol ("VoIP") services, and in particular, relates to systems, methods, and a machine readable medium for enabling communications between a plain old telephone service (POTS) device and a packet data network.

BACKGROUND

Traditionally, providers of voice over Internet protocol ("VoIP") services provided a "closed" system that allowed only proprietary VoIP hardware to operate within the VoIP service provider's networked infrastructure. Recently, other VoIP service providers have provided "open" systems that allow general VoIP hardware to operate within the VoIP infrastructure. One problem with "open" VoIP systems is that VoIP hardware, such as a VoIP-enabled personal computer ("PC") or a VoIP-enabled mobile device, must be specifically configured for only one individual VoIP system, resulting in VoIP users ("users") that are segregated to a particular VoIP service provider and/or requiring a VoIP user to purchase an additional VoIP-enabled device to operate at each "open" VoIP system.

SUMMARY

A universal VoIP system is established to allow a universal VoIP-enabled device, such as a VoIP-enabled PC or mobile device, to interoperate with multiple VoIP service provider's networked infrastructures. The VoIP system can include the a VoIP interface device and a host system. The VoIP interface may consist of a VoIP adapter to enable VoIP communications at a device, such as a PC, laptop, mobile device, or tablet; and a VoIP jack to allow a standard telephone to communicate with the VoIP adapter. The VoIP adapter and VoIP jack may be separate modules or combined into a single module. The host system can configure the VoIP interface to operate on multiple VoIP service providers' networks and can optionally configure a sound subsystem for use by a user conducting a VoIP call. The VoIP interface system can operate as a Session Initiation Protocol (SIP) user agent to create or receive SIP messages and thereby manage a SIP session.

In some embodiments, in addition to the standards POTS features and features available on other VoIP-enabled phones, the VoIP system can provide enhanced VoIP features and services. For example, VoIP interface system can be configured to receive power from a standard conventional power supply, such as the conventional power provided by a home/office outlet. Alternatively or additionally, the VoIP interface system can distribute and receive power through an interface, such as a universal serial bus (USB). The VoIP interface system can receive power to use directly, and/or the VoIP interface can store the power at a battery component.

In some embodiments, another enhanced service provided by the VoIP interface system is its ability to integrate calls from different VoIP service providers. For example, when configured to operate on at least two different VoIP service providers' networks, the VoIP interface system can establish separate VoIP calls (simply referred to as "calls") to each of the two VoIP service provider's networks. The VoIP interface system can then integrate the two separate calls into a grouped provider VoIP call that allows users of the different VoIP service providers to simultaneous conference across the different VoIP provided networks.

In some embodiments, a host system can program and reprogram the VoIP interface system to interoperate with one or more VoIP service providers. The host system communicates with the VoIP interface system by transferring configuration information to an interface of the VoIP interface system. Furthermore, the host system can automatically configure the VoIP interface system to access an Internet Service Provider (ISP) subscribed to by the user. For example, upon detection of the VoIP interface system, the host system can configure the VoIP interface system with an IP Address, netmask, and gateway provided by the ISP, based on using Dynamic Host Configuration Protocol (DHCP), for example.

In some embodiments, the host system can also provide a menu system to assist the user with configuring features and services of the VoIP interface system. The menu system may be graphically driven and configured to receive user selections. The menu system can provide user-selectable profiles for each ISP and/or VoIP service provider. In some embodiments, the menu system can be a graphical drop down menu.

A profile can store ISP and/or VoIP service provider information, such as proxy, gateway, and registrar data; and user specific information, such as data to authenticate a user for access at the ISP/VoIP service provider networks, a telephone, security configuration data, and contact information to populate a contact list of the VoIP interface system. Upon a user-selection, or performed automatically by the host system, a profile can be loaded to the VoIP interface system to configure the VoIP interface system for operation based on data within the profile. In another embodiment, multiple profiles can be loaded to the VoIP interface system to enable the VoIP interface system to connect, separately or simultaneously, to multiple different VoIP networks.

Based on the presently disclosed techniques, the VoIP system can perform several additional functions, including: connecting VoIP through a standard phone without using a separate microphone and speaker; providing a subscriber line interface circuit ("SLIC") interface for analog phone connections; supporting cordless phone sets including DECT, 2.4 GHz, 900 MHz or others; supporting IM messenger software; answering a VoIP call by picking up the handset of a regular phone line; making a VoIP call through a phone keypad directly or a by using a VoIP user interface; supporting VoIP speed dial number and VoIPOut directly through a phone keypad; connecting VoIP and VoIPIn calls into a PBX or enterprise IVR; making a VoIPOut call directly from a PBX digital extension set; providing 16 bit audio pulse code modulation ("PCM"); automatically configuring a VoIP audio device; creating a conference call and switching between calls circularly by utilizing a phone keypad; creating a conference call and joining new calls into the conference sequentially by utilizing a phone keypad; support international busy tone generation to connect with a PBX; supporting 20, 25, 30 and 50 Hz ring signal frequency; supporting 2 REN standard loads; supporting standard windows USB audio device with a unique device ID; and supporting Type I FSK Caller ID for VoIP calls with speed dial number for easy call back.

DETAILED DESCRIPTION

Figure 1:
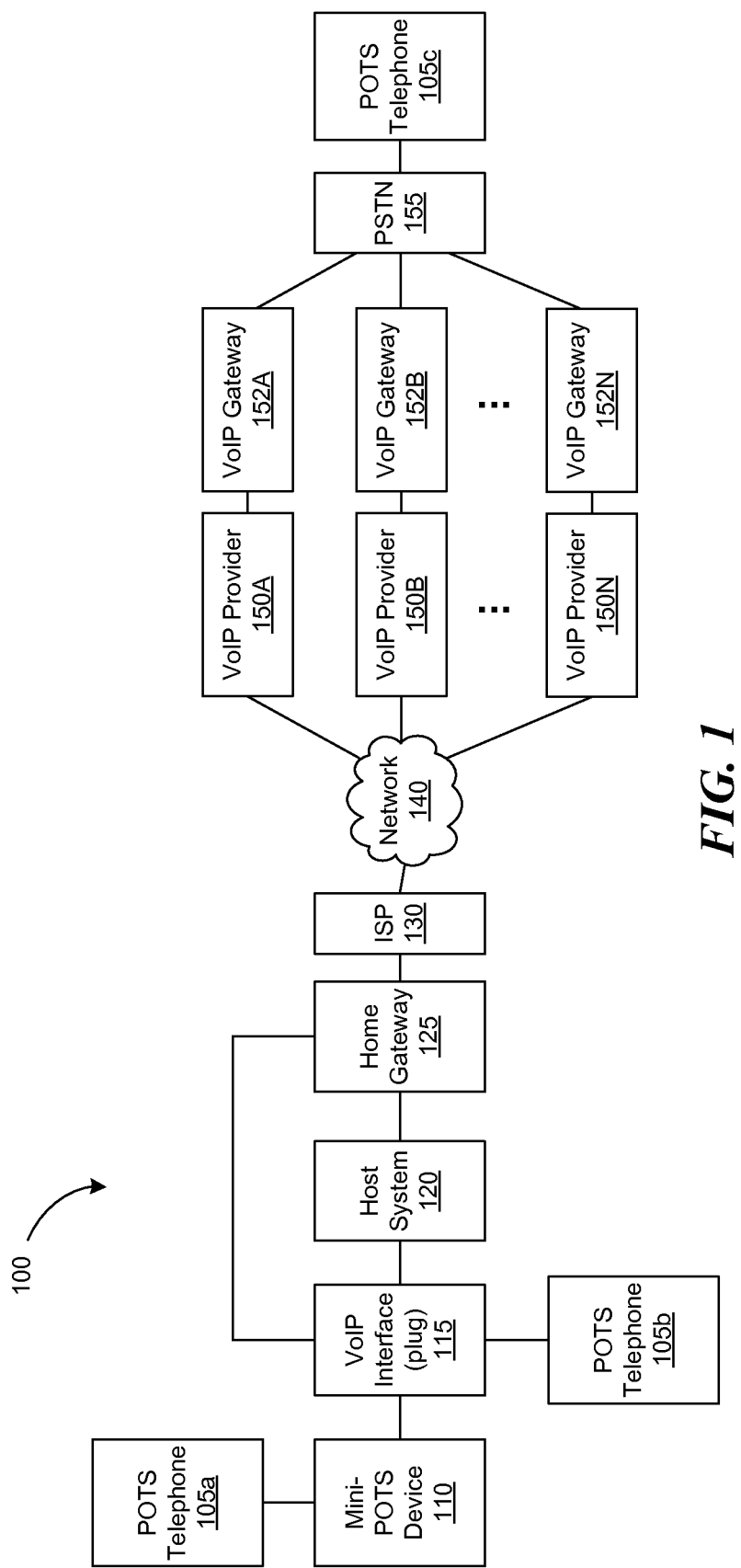
FIG. 1 depicts a block diagram of a network configuration suitable enabling communications between a POTS device and a packet data network.

The following description and drawings are illustrative and are not to be construed as limiting. Numerous specific details are described to provide a thorough understanding of the disclosure. However, in certain instances, well-known or conventional details are not described in order to avoid obscuring the description. References to one or an embodiment in the present disclosure can be, but not necessarily are, references to the same embodiment; and, such references mean at least one of the embodiments.

Reference in this specification to "one embodiment" or "an embodiment" means that a particular feature, structure, or characteristic described in connection with the embodiment is included in at least one embodiment of the disclosure. The appearances of the phrase "in one embodiment" in various places in the specification are not necessarily all referring to the same embodiment, nor are separate or alternative embodiments mutually exclusive of other embodiments. Moreover, various features are described which may be exhibited by some embodiments and not by others. Similarly, various requirements are described which may be requirements for some embodiments but not other embodiments.

The terms used in this specification generally have their ordinary meanings in the art, within the context of the disclosure, and in the specific context where each term is used. Certain terms that are used to describe the disclosure are discussed below, or elsewhere in the specification, to provide additional guidance to the practitioner regarding the description of the disclosure. For convenience, certain terms may be highlighted, for example using italics and/or quotation marks. The use of highlighting has no influence on the scope and meaning of a term; the scope and meaning of a term is the same, in the same context, whether or not it is highlighted. It will be appreciated that same thing can be said in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various embodiments given in this specification.

Without intent to further limit the scope of the disclosure, examples of instruments, apparatus, methods and their related results according to the embodiments of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Embodiments of the present disclosure include systems and methods for enabling communications between a plain old telephone service (POTS) device and a packet data network.

FIG. 1 depicts a block diagram of a network configuration environment 100 suitable enabling communications between a plain old telephone service (POTS) device and a packet data network, according to an embodiment. The network configuration environment 100 includes POTS telephones 105a-c, mini-POTS device 110, VoIP interface (or plug) 115, host system 120, home gateway 125, Internet Service Provider (ISP) 130, network 140, VoIP service providers 150A-N, VoIP gateways 152A-N, and public switched telephone network (PSTN) 155. The network configuration environment 100 described herein is used to illustrate one type of network configuration in which the techniques can be implemented; however, other network storage configurations and schemes can be used for implementing the techniques introduced herein.

The network configuration environment 100 can be utilized to implement aspects of the invention. For example, in one embodiment, the network configuration environment 100 is used to configure the VoIP interface 115 to access the network 140. The VoIP interface 115 can additionally be configured to access one or more of the VoIP service providers 150a-n, based on the host system120 installing configuration data from the VoIP interface 115. The VoIP interface 115 can place a call to one or more of the VoIP service providers' networks, connect into a grouped call with separate calls from disparate VoIP service providers 150a-n, and perform other features and services disclosed herein.

VoIP service providers 102a-102n may be, for example, conventional VoIP service providers that provide an "open" network infrastructure. A network infrastructure is "open" if it allows various types of VoIP devices to operate on the network and perform VoIP functions. A network infrastructure is "closed" if the VoIP service provider restricts the type of VoIP devices that can access the network infrastructure. Some examples of VoIP service providers 150a-150n that provide "open" VoIP-enabled network infrastructure include Skype®, Google®, Yahoo®, and Face Book®, However, the techniques disclosed are applicable to other "open" VoIP-enabled network infrastructures. It is appreciated that the VoIP service providers typically provide service to users via the user's ISP.

The network 140 connects the ISP 130 and the VoIP service providers 150a-150n. The network 140 can be a local area network ("LAN"), and/or a wide area network ("WAN"), and/or a global area network, such as the Internet, and can make use of any known or convenient network technologies to transfer VoIP data from the VoIP interface 115 for delivery to one or more of the VoIP service providers 150a-150n.

The ISP 130 can be any system and/or device, and/or any combination of devices/systems operated by a company, or group of companies, that provides users with access to VoIP service providers 150a-150n via the network 140. The ISP 130 can utilize a data transmission technology, such as the home gateway 125, for communicating VoIP data between the user (e.g., the VoIP Interface 115) and the one or more VoIP service providers 150a-150n. Typically, the VoIP data is delivered in the form of IP packets or frames.

The home gateway 125 can be any system and/or device, and/or any combination of devices/systems that is able to communicatively connect devices, such as the VoIP interface plug 115 and/or host system 120 to the network 140 via the ISP 130. The home gateway 125 may have a first interface for connecting the home gateway 125 to the ISP 130 and a second interface for connecting the home gateway 125 to the to the host system120 and/or the VoIP interface 115. Examples of some of the technologies that can be used by the first interface include, but are not limited to, broadband wireless access, cable modem, Dialup (ISDN or modem), DSL, FTTH, Wi-Fi, and dedicated high-speed interconnects, such as transmissions lines. Examples of technologies that can be utilized by the second interface include, but are not limited to, Ethernet and/or any other layer-2 technologies that enable the home gateway 125 to communicate with other devices, such as host system 120 and/or VoIP interface 115.

The host system 120 can be any system and/or device, and/or any combination of devices/systems that is able to configure the VoIP interface 115 to connect to one or more of the VoIP service providers 150a-150n. The host system 120 may have multiple interfaces, each interface configured to communicate data used to perform techniques disclosed herein. For example, a first interface may be configured to communicate with the home gateway 125 by using Ethernet protocols. The second interface can be configured to communicate with the VoIP interface 115 using various technologies such as, but not limited to, USB, FIREWIRE, Wi-Fi, the 802.11 family of protocols, Bluetooth, and/or other communication standards. In one embodiment, the host system 120 may be a computer, such as a typical personal computer (PC), laptop, tablet computer, or other portable computing device capable of communicating with the home gateway 125 and the VoIP interface 115. The host system 120 can, additionally, be separately connected to or include a display (not shown) for presenting VoIP configuration information to the user.

The host system 120 is a system that can be used to configure the VoIP interface 115 to access one or more of the VoIP service providers 150a-150n. The host system 120 can use a text-based system and/or a graphics-based system that can be manipulated by a user to configure the VoIP interface 115. The system can be menu-driven, such that a text- or GUI-based menu of VoIP configuration options is presented to the user. The host system 120 can store VoIP configuration data that can be used by the VoIP interface 115 to access each of the VoIP service providers' 150a-n networks. The VoIP data can be updated by the host system 120, the VoIP service providers 150a-n, or a third-party, via network 140.

In some embodiments, the VoIP data can be organized into VoIP service provider-specific profiles that contain the data and information, such as SIP information, gateway and registrar information, and user authentication information (e.g., usernames and passwords) that may be required to access a VoIP service provider 150a-n and/or ISP 130. SIP is an IETF-defined signaling protocol, widely used for controlling multimedia communication sessions such as voice and video calls over Internet Protocol (IP) that can provide, when combined with aspects of the VoIP interface system 115, features that have become standard on traditional plain old telephone service (POTS), such as dial, answer, reject, Caller-ID, voicemail, putting a call on Hold/Unhold, conferencing, call forwarding, and telephone number portability.

In some embodiments, one or more profiles can be selected by a user, via the menu, and the host system 120 can automatically transfer each selected profile for delivery to the VoIP interface 115 so that the VoIP interface 115 can be configured for accessing the selected VoIP service providers 150a-n.

The VoIP interface 115 can be any system and/or device, and/or any combination of devices/systems that can be configured to operate with VoIP services from multiple VoIP service providers 150a-n. The VoIP interface 115 may comprise a VoIP adapter to enable VoIP communications at a device, such as the host system 120, and a VoIP jack to allow a standard POTS telephone 105b or a mini-POTS device 110 to communicate with the VoIP adapter for use in VoIP calls. The VoIP adapter and VoIP jack may be separate modules or combined into a single module. For purposes of describing the present techniques, the combined VoIP adapter and VoIP jack is presented as VoIP interface 115 in FIG. 1.

The VoIP interface 115 can have multiple interfaces. In one embodiment, the first interface can be configured to communicate with the host system 120 to transfer VoIP service provider profiles for enabling the VoIP interface 115 to access the VoIP service providers' VoIP services. In another embodiment, the first interface can be configured to bypass the host system 120 and directly connect to the home gateway 125 to receive VoIP service provider profiles from a third party (not shown). In one embodiment, the second interface is configured to communicate with a standard POTS telephone 105 or a mini-POTS device 110 using a port, such as a port conforming to the RJ-11 specification. The POTS telephone 105 can be typical wired or wireless telephones that can connect to the VoIP interface 115 to communicate, in real-time, users' voices (e.g., voice data) as they are spoken. The mini-POTS device 110 can connect to the VoIP interface 115 to communicate, in real-time, users' voices (e.g., voice data) as they are spoken. The mini-POTS device 110 is discussed in more detail with reference to FIG. 5. In some embodiments, the mini-POTS device 110 and the VoIP interface plug 115 are combined into a single portable (i.e., mobile) device or system.

In some embodiments, the VoIP interface 115 can receive power from a standard conventional wall outlet (not shown). Alternatively or additionally, in some embodiments, the VoIP interface 115 can receive power via one or more of its interfaces. For example, the VoIP interface 115 can receive power, via a USB interface, from the host system 120 or the home gateway 125. Receiving power directly from the home gateway 125 or from the wall outlet allows the VoIP interface 115 to operate regardless of whether the host system 120 is powered up and/or online.

In some embodiments, the VoIP interface 115 and the host system 20 can be combined into a single device (not show), such as VoIP-enabled phone, tablet computer, or other mobile device. The single device can connect to the home gateway 125 in a manner similar to the manner that the host system 120 connects to the home gateway 125, as described above. The single device may contain or connect to a display for performing the user selection of VoIP service provider profiles, as described above.

Figure 2:
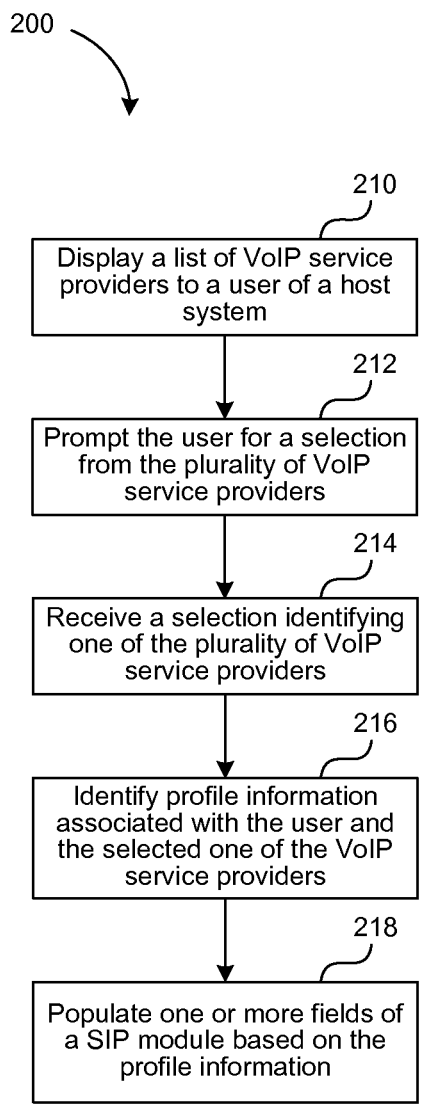
FIG. 2 depicts a flow diagram illustrating an example process for enabling communications between a POTS device and a packet data network.

FIG. 2 depicts a flow diagram illustrating an example process 200 for enabling communications between a POTS device and a packet data network, according to an embodiment. The POTS device may be any POTS device such as, for example, POTS telephone 105 and/or a mini-POTS device 110 of FIG. 1. Similarly, the packet data network may be any packet network such as, for example, network 140 of FIG. 1. In some embodiments, the example process 200 may be performed by a host system such as, for example, host system 120.

To begin, the host system identifies a new connection between a VoIP interface system and the host system when or shortly after the VoIP interface system is connected to the host system. In some embodiments, the VoIP interface system connects to the host system via a USB connection, and upon detection of the new connection, the VoIP interface device transfers instructions stored in a memory system on the VoIP interface system to the host system. In some embodiments, an operating system executing on the host system instructs the host to autoload the instructions when the USB device is connected. In some embodiments, the VoIP interface system detects the connection and pushes the instructions stored in the memory system to the host system.

In process 210, the host system displays a list of VoIP service providers to a user of the host system. The list of VoIP service providers may be displayed on an external display device such as, for example a computer monitor. In other embodiments, the host system 120 may include a built-in display system. The list of VoIP service providers may include conventional VoIP service providers that provide an "open" network infrastructure. Examples of VoIP service providers include, but are not limited to, Skype®, Google®, Yahoo®, and Facebook®. It is appreciated that these services provide VoIP services to a user when accessed via the user's ISP.

In process 212, the host system prompts the user to make a selection from the list of the plurality of VoIP service providers. In some embodiments, the list of the plurality of VoIP service providers is determined based on instructions transferred from the VoIP interface system to the host system when connected. In other embodiments, the list of the plurality of VoIP service providers is determined based on instructions transferred from the VoIP interface system and/or instructions downloaded over the network. The list of the plurality of VoIP service providers may comprise a menu to assist the user with configuring features and services of the VoIP interface system.

In some embodiments, the menu system may be graphically driven and configured to receive user selections. For example, the menu system can provide user-selectable profiles for each ISP and/or VoIP service provider. For example, in some embodiments, the menu system may be a graphical drop down menu that is electronically presented to the user via a display. A profile can store ISP and/or VoIP service provider information, such as proxy, gateway, and registrar data; and user specific information, such as data to authenticate a user for access at the ISP/VoIP service provider networks, a telephone, security configuration data, and contact information to populate a contact list of the VoIP interface system.

In process 214, the host system receives a selection from the user identifying one of the plurality of VoIP service providers. In some embodiments, the user makes a selection via an input device on the host system; however, selection may be made by the user in any number of ways.

In process 216, the host system identifies profile information associated with the user and the selected one of the VoIP service providers. For example, in some embodiments, the host system identifies necessary login credential and a proxy server associated with the selected one of the VoIP service providers by launching the software associated with the selected one of the VoIP service providers.

In process 218, the host system populates one or more fields of a session initiation protocol (SIP) module based on the profile information. Once populated, the host system is then configured to communication with the selected one VoIP service provider. In some embodiments, the selected one VoIP service provider software may further prompt the user to determine whether it is alright to handshake with the third party software (i.e., the software transferred over from the VoIP interface memory system). Once the user accepts the handshaking process, communication with the VoIP service provider can commence.

Figure 3A:
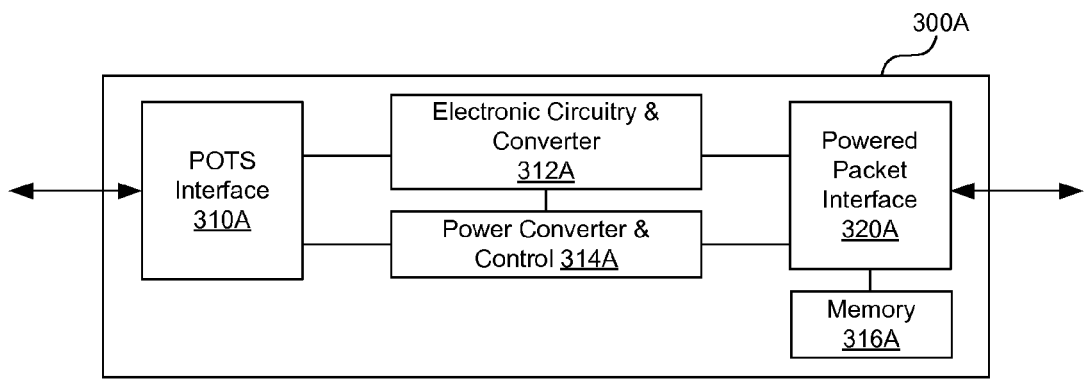
FIGS. 3A and 3B depict block diagrams illustrating components of various VoIP interface systems for enabling communications between a POTS device and a packet data networks.
Figure 3B:
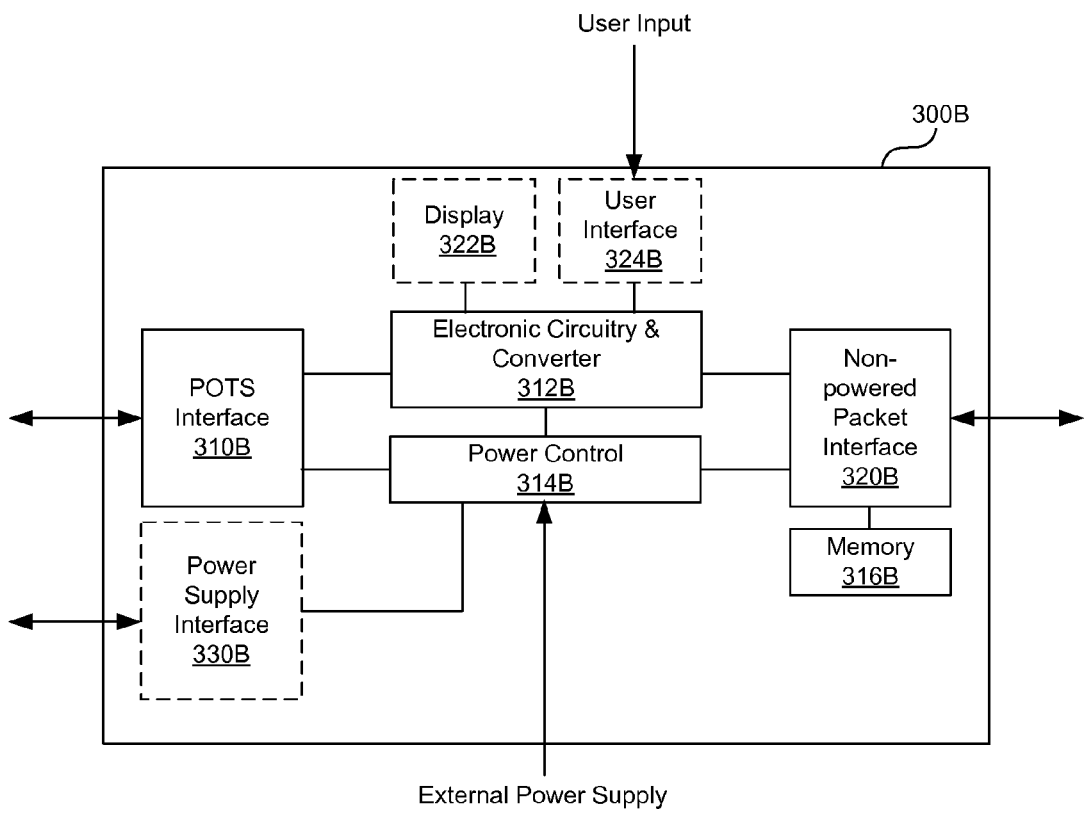

FIGS. 3A and 3B depict block diagrams illustrating components of respective VoIP interface systems 300A and 300B for enabling communications between POTS devices and a packet data network, according to various embodiments. In particular, VoIP interfaces 300A and 300B illustrate components of various VoIP interface systems that include powered packet-based interfaces that connect to host systems as well as non-powered packet-based interfaces that directly connect to home gateways.

VoIP interface systems 300A and 300B, although illustrated as comprised of distributed components (physically distributed and/or functionally distributed), could be implemented as a collective element. In some embodiments, some or all of the components, and/or the functions represented by each of the components can be combined in any convenient or known manner. Furthermore, the functions represented by the components can be implemented individually or in any combination thereof, partially or wholly, in hardware, software, or a combination of hardware and software.

In the example of FIG. 3A, VoIP interface system 300A includes a POTS interface 310A, electronic circuitry and converter 312A, power converter and control 314A, a powered packet-based interface 320A, and a memory system 316A. In some embodiments, the POTS interface 310A is configured to communicate two-way voice telephone communications with the POTS device. The powered packet-based interface 320A is configured to communicate packet-based two-way voice telephone communications with a host system, such as host system 120 of FIG. 1. The powered packet-based interface 320A is configured receive power for the VoIP interface 300A from the host system. In some embodiments, the powered packet-based interface 320A comprises a USB interface.

Electronic circuitry and converter 312A is communicatively coupled to the POTS interface 310A, the powered packet-based interface 320A, and the memory system 316A. The electronic circuitry and converter 312A is configured to convert the two-way voice communications received from the POTS interface 310A to packet-based voice communications and the packet-based voice communications received from the USB interface 320A to POTS voice communications.

In some embodiments, the electronic circuitry and converter 312A may further include a memory (not shown) for storing an operating system (not shown). The operating system may also be stored on memory system 316A, discussed below. In some embodiments, the electronic circuitry and converter 312A may include a processor subsystem that includes one or more processors that can be implemented by programmable circuitry programmed or configured by software and/or firmware, or entirely by special-purpose circuitry, or in a combination of such forms. Such special-purpose circuitry (if any) can be in the form of, for example, one or more application-specific integrated circuits (ASICs), programmable logic devices (PLDs), field-programmable gate arrays (FPGAs), etc.

The electronic circuitry and converter 312A is configured to enable the VoIP interface system 300A to operate on one or more of the VoIP service provider networks 150a-n. In operation, the electronic circuitry and converter 312A receives and converts data at the interfaces 310A and 320A.

The memory system 316A is a memory system configured to store a set of instructions that are transferred to, and executed by, the host system when the powered packet-based interface 320A is connected to the host system. When executed by the host system, the set of instructions direct the host system to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information.

In some embodiments, the set of instruction alternatively or additionally direct the host system to access the network for additional instructions such as drivers, etc. In this example, the additional instructions and/or the initial instructions transferred from the VoIP interface device direct the host system to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information.

In some embodiments, the memory system 316A can include storage locations that are addressable by the electronic circuitry and converter 312A and external host systems for storing software program code and data structures associated with the techniques introduced here. The electronic circuitry and converter 312A may, in turn, include processing elements and/or logic circuitry configured to execute the software code and manipulate the data structures. Other processing and memory implementations, including various computer readable storage media, may be used for storing and executing program instructions pertaining to the techniques introduced here.

In the example of FIG. 3B, VoIP interface system 300B includes a POTS interface 310B, electronic circuitry and converter 312B, power control 314B, a non-powered packet-based interface 320B, a memory system 316B, an optional display 322B, an optional user interface 324B, and an optional power supply interface 330B. In some embodiments, the POTS interface 310B is configured to communicate two-way voice telephone communications with the POTS device. The non-powered packet-based interface 320B is configured to communicate packet-based two-way voice telephone communications with a host system (or host computer system), such as host system 120 or home gateway 125 of FIG. 1. In some embodiments, the non-powered packet-based interface 320A comprises an Ethernet interface and/or an IEEE 802.11 Wifi interface.

In some embodiments, the display 322B can be external to the VoIP interface system 300B. Alternatively, the display 322B can be internal to the VoIP interface system 300B, as shown in FIG. 3B. The display 322B may utilize known or available technologies, such as LCDs, LEDs, Plasma, OLED, etc., to display VoIP profile and/or VoIP configuration information.

In some embodiments, power control 314B receives an external power supply allowing VoIP interface system 300B to operate even when a host system 120 is powered off or not otherwise connected to network 140.

Figure 4:
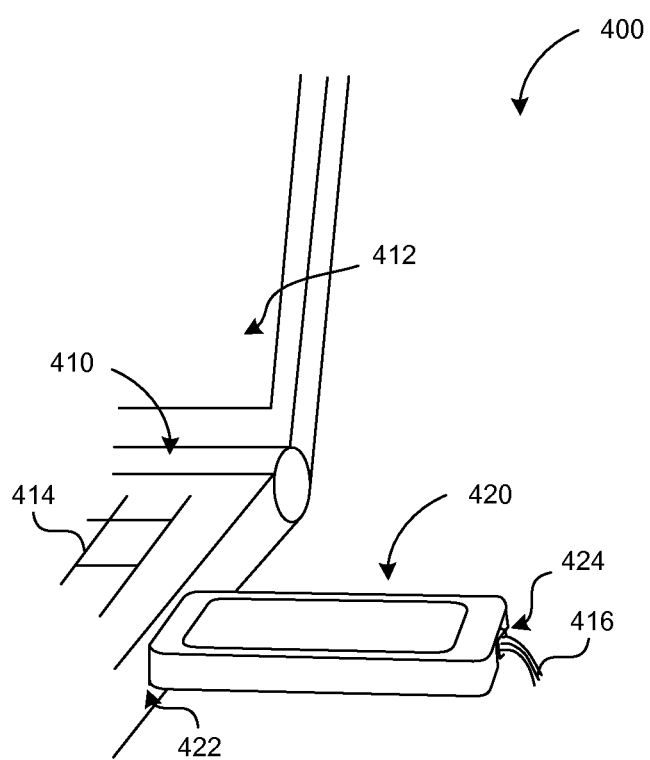
FIG. 4 depicts a USB VoIP interface system for enabling communications between a POTS device and a packet data network.

FIG. 4 depicts an interface system environment 400 for enabling communications between a POTS device (not shown) and a packet data network (not shown) by way of host system 410, according to an embodiment. The interface system environment 400 includes host system 410 and USB VoIP interface system 420.

According to the example of FIG. 4, host system 410 comprises a portable computer device such as, for example, a laptop computer. Host system 410 includes a monitor 412, a keyboard or keypad 414, and a female USB interface (which is connected to the male USB interface 422 of VoIP interface system 420. VoIP interface system 420 includes a female POTS interface 424 for connecting to a POTS cable 416.

Figure 5:
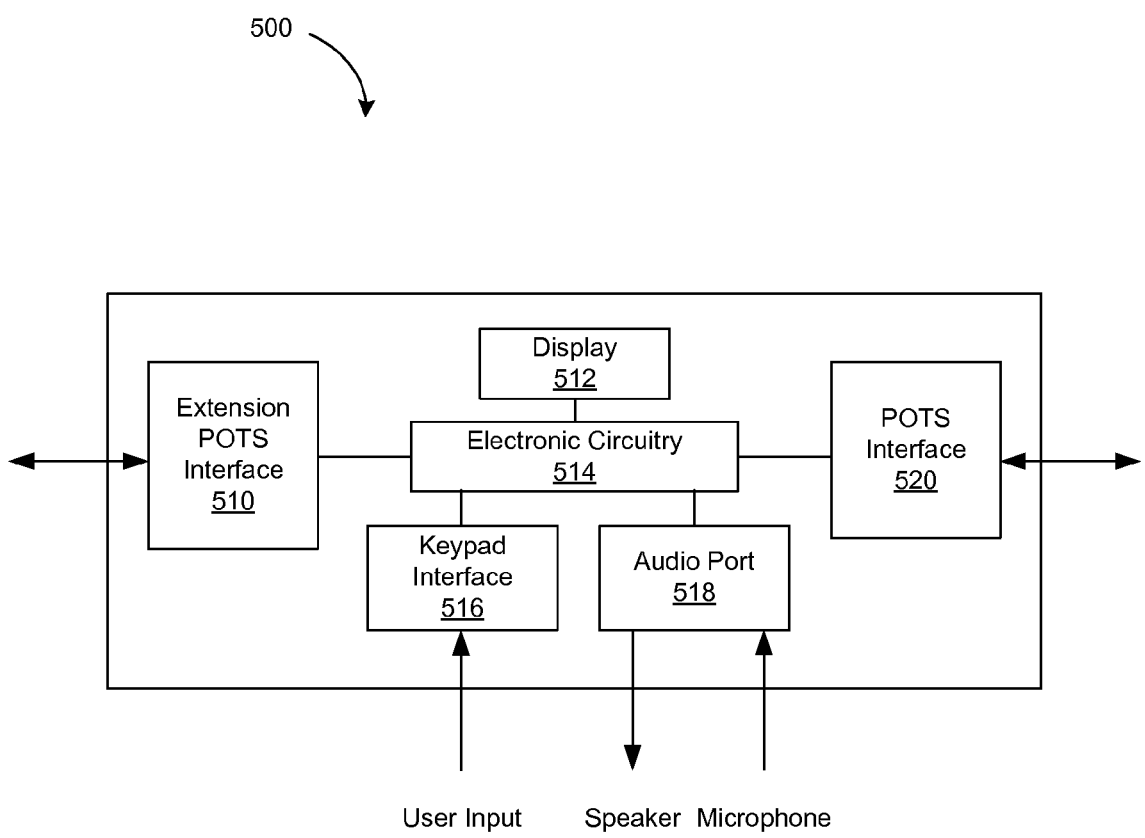
FIG. 5 depicts a block diagram illustrating components of a portable mini-POTS device for communicating over a VoIP network.

FIG. 5 depicts a block diagram illustrating components of a portable mini-POTS device 500 for communicating over a VoIP network, according to an embodiment. In particular, the portable mini-POTS device 500 includes an extension POTS interface 510, a display 512, electronic circuitry 514, a keypad interface 516, an audio port 518, and a POTS interface 520. The POTS interface 520 is configured to communicate two-way voice telephone communications with a VoIP interface system (not shown). The POTS interface 520 is further configured to receive power for the portable telephone system. In some embodiments, the POTS interface 520 comprises an RJ11 telephone interface. In these embodiments, the POTS interface may receive low voltage direct current power to power the portable telephone system via pins 2 and 5 of the RJ11 telephone interface.

In some embodiments, display 512 comprises a liquid crystal display (LCD). The LCD display may be a blue light display powered with the power received at the POTS interface. In some embodiments, the LCD display is further configured to display call status information including the user input. For example, the LCD display may display a caller ID (e.g., the name and/or number of a received call), the digits as they are dialed, etc.

In some embodiments, the keypad interface 516 includes keys that provide a user with the ability to input alphanumeric information including, but not limited to, telephone numbers. In some embodiments, the audio port 518 is configured to transfer voice telephone communications received over the POTS interface to a speaker system and to receive voice signals from a microphone system.

In some embodiments, the extension POTS interface 510 is configured to extend the voice telephone communications to one or more additional POTS devices (see for example, POTS telephone 105a of FIG. 1. In some embodiments, the extension POTS port 510 is further configured to provide power to the one or more additional POTS devices using the power received from the POTS interface 520.

The portable mini-POTS device 500, although illustrated as comprised of distributed components (physically distributed and/or functionally distributed), could be implemented as a collective element. In some embodiments, some or all of the components, and/or the functions represented by each of the components can be combined in any convenient or known manner. Furthermore, the functions represented by the components can be implemented individually or in any combination thereof, partially or wholly, in hardware, software, or a combination of hardware and software.

In some embodiments, the portable mini-POTS device 500 may be combined with one or more VoIP interface devices (e.g., VoIP interface systems 300A and/or 300B). Furthermore, in some embodiments, the portable mini-POTS device 500 may be configured to provide video conferencing with the addition of a display (not shown in some embodiments) and a camera system. In this example, the combined system is configured to provide video conferencing capabilities to a user. In some embodiments, the video encoding and decoding are done by electronic circuitry which may include one or more processors (e.g., electronic circuitry 522). In other embodiments, specific modules perform one or both of the video encoding and decoding functions. The video coding may be any known coding standard such as, for example, MPEG 2/4, etc.

Figure 6A:
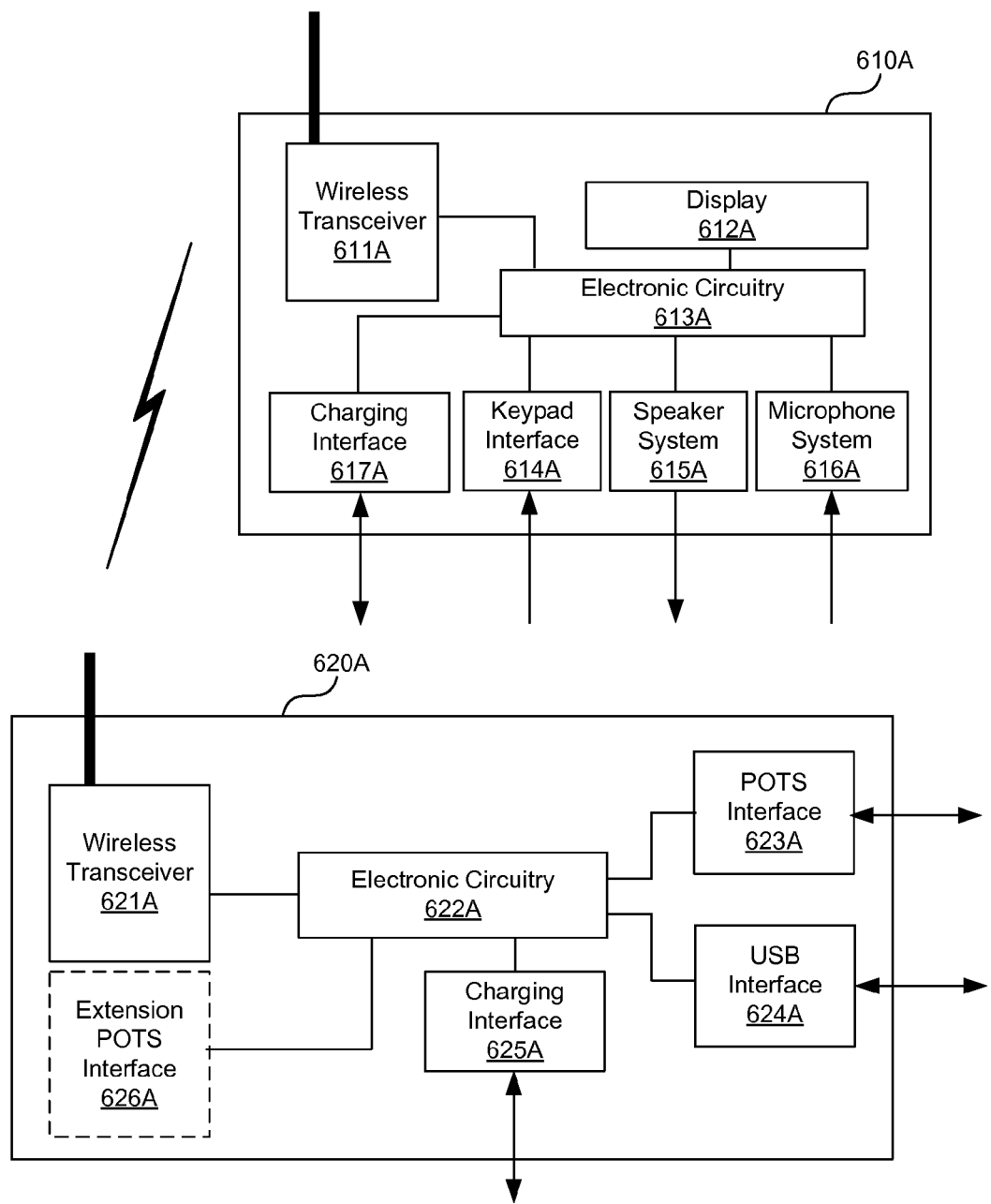
FIGS. 6A and 6B depict a block diagrams illustrating components of a wireless portable mini-POTS devices and base stations for communicating over a VoIP network.
Figure 6B:
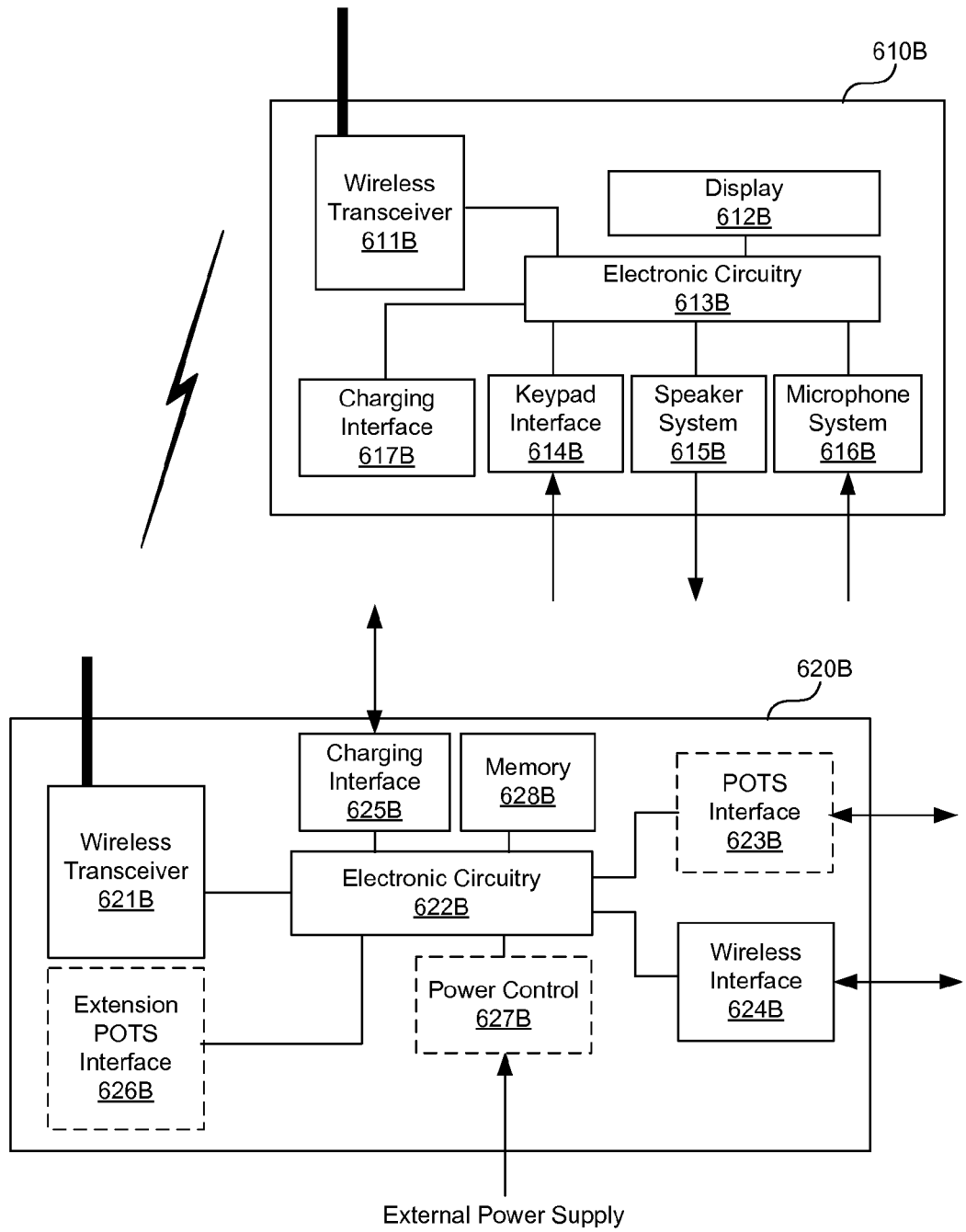

FIGS. 6A and 6B depict a block diagrams illustrating components of a wireless portable mini-POTS devices and base stations for communicating over a VoIP network.

The portable wireless mini-POTS devices and base station, although illustrated as comprised of distributed components (physically distributed and/or functionally distributed), could be implemented as a collective element. In some embodiments, some or all of the components, and/or the functions represented by each of the components can be combined in any convenient or known manner. Furthermore, the functions represented by the components can be implemented individually or in any combination thereof, partially or wholly, in hardware, software, or a combination of hardware and software.

FIG. 6A depicts a block diagram illustrating components of a wireless portable mini-POTS device 610A and a base station 620A for communicating over a VoIP network, according to an embodiment. In the example of FIG. 6A, the wireless portable mini-POTS device 610A includes a wireless transceiver 611A, a display 612A, electronic circuitry 613A, a keypad interface 614A, and an optional speaker system 615A and optional microphone 616A. In some embodiments, the speaker system 615A and microphone 616A may be a headset device (not shown) that plugs into a two-way audio port. The wireless portable mini-POTS device 610A also includes a charging interface 617A having contacts thereon for receiving power to charge a battery (not shown) of the wireless portable mini-POTS device 610A.

In the example of FIG. 6A, the base station 620A may be a portable wireless telephone docking system. The base station 620A includes a housing configured to cradle the wireless portable mini-POTS device 610A. The base station 620A also includes a POTS interface 623A disposed on the housing and configured to communicate two-way voice telephone communications. In some embodiments, the POTS interface 623A is further configured to receive power for the base station 620A. The base station 620A includes a wireless transceiver 621 disposed within the housing and configured to wirelessly communicate the two-way voice telephone communications via radio signals to the wireless portable mini-POTS device 610A. The radio signals may be communicated via one or more licensed and/or unlicensed frequencies.

In the example of FIG. 6A, the base station 620A includes a charging interface 625A disposed on the housing and configured to charge the battery (not shown) of the wireless portable mini-POTS device 610A when wireless portable mini-POTS device 610A is docked (i.e., cradled in base station 620A such that contacts on the charging interface 617A and charging interface 625A are in physical contact). The base station 620A also includes electronic circuitry 622A disposed within the housing and communicatively coupled to the POTS interface 623A, the wireless transceiver 621A, and the charging interface 625A. The electronic circuitry 622A is configured to communicate the two-way voice telephone communications between the POTS interface 623A and the wireless transceiver 621A.

FIG. 6B depicts a block diagram illustrating components of a wireless portable mini-POTS device 610B and a base station 620B for communicating over a VoIP network, according to an embodiment. The wireless portable mini-POTS device 610A is similar to the wireless portable mini-POTS device 610B of FIG. 6B.

In the example of FIG. 6B, the base station 620B may be a portable wireless telephone docking system. The base station 620B is similar to base station 620A although base station 620B includes a wireless interface 624B configured to communicate wirelessly with a home gateway system (not shown) using WiFi and/or communicate with a base station using any 3G and/or 4G wireless technology.

The base station 620B also includes a memory system 628. Memory system 628B is configured to store a set of instructions that are executed by one or more processors within electronic circuitry 622B. When executed, the set of instructions direct the base station 620B and/or the wireless portable mini-POTS device 610B to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information.

In some embodiments, the wireless portable mini-POTS device 610B includes an optional camera system (not shown). In this example, the wireless portable mini-POTS device 610B and the base station 620B are configured to provide two-way video conferencing capabilities to a user. In some embodiments, the video encoding and decoding are done by electronic circuitry 622B. In other embodiments, specific modules perform one or both of the video encoding and decoding functions. The video coding standards used may be any known coding standard such as, for example, MPEG 2/4, etc.

Figure 7A:
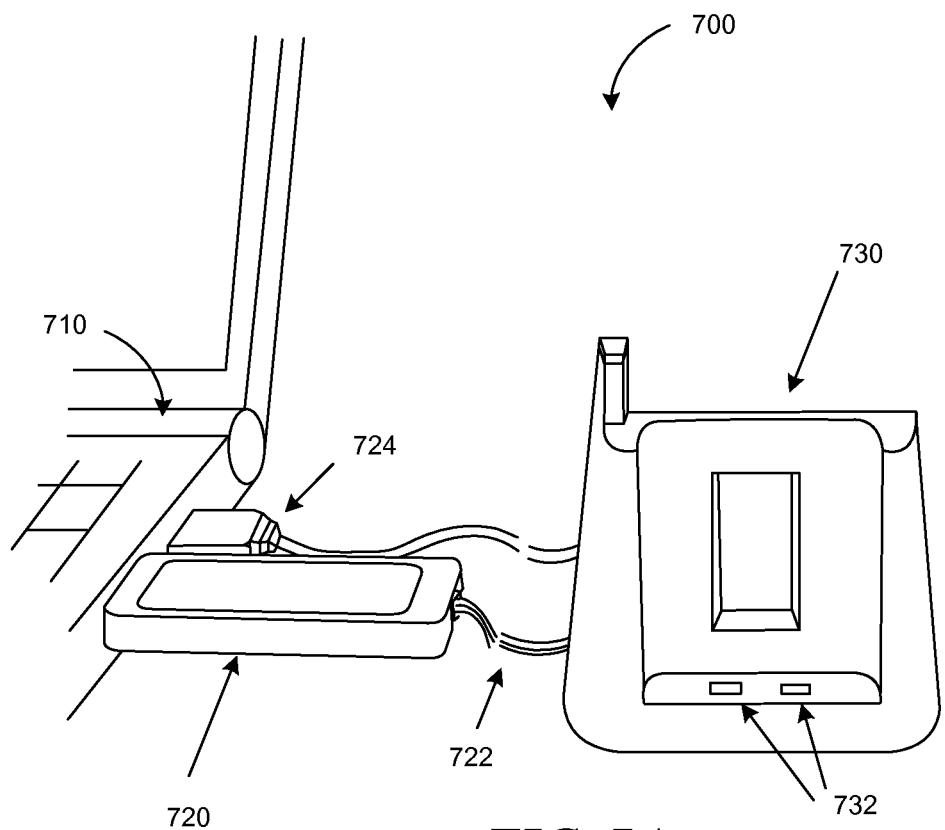
FIGS. 7A and 7B depict a USB VoIP interface system with a wireless portable mini-POTS based station for communicating over a VoIP network.
Figure 7B:
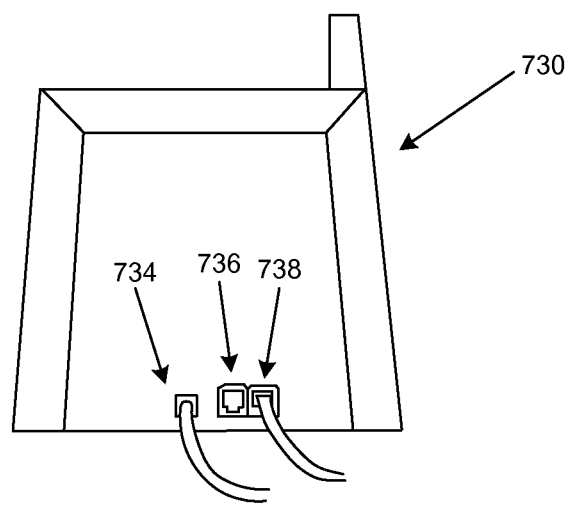

FIGS. 7A and 7B depict a USB VoIP interface system 720 with a wireless portable mini-POTS base station 730 for communicating over a VoIP network, according to an embodiment. In particular, FIG. 7A illustrates an interface system environment 700 for enabling communications between the base station 730 and a packet data network (not shown) by way of host system 710. In the example of FIG. 7A, base station 730 includes charging interface contacts 732.

FIG. 7B illustrates back side view of base station 730. In particular, FIG. 7B illustrates a powered packet-based interface 734 configured to receive power for the base station 730 from host system 710. In some embodiments, USB interface 724 provides power for the base station 730. The base station 730 also includes an extension POTS port 736 configured to extend voice telephone service to one or more additional POTS devices, and a POTS interface 738 configured to communicate two-way voice telephone communications via cable 722, USB VoIP interface system 720, and host system 710. In some embodiments, cable 722 comprises an RJ11 telephone cable.

FIGS. 8A-8D depict various views of a wireless portable mini-POTS device 800 configured to wirelessly communicate with a portable wireless telephone docking system such as base station 730 of FIG. 7, according to an embodiment.

Figure 8A:
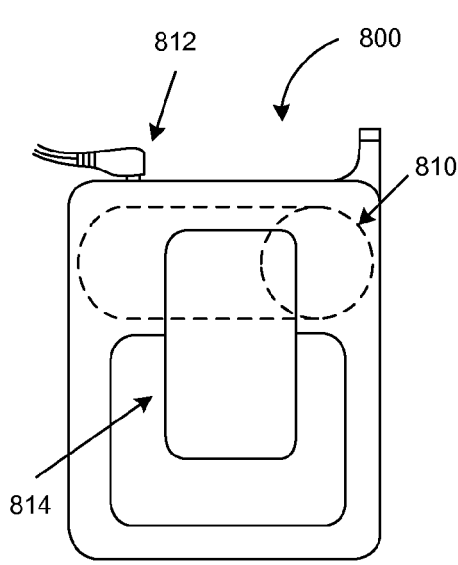
FIGS. 8A-8D depict various view of a wireless portable mini-POTS device for communicating over a VoIP network.

The example of FIG. 8A illustrates a back side view of the wireless portable mini-POTS device 800, according to an embodiment. The wireless portable mini-POTS device 800 includes a battery 810, an audio port 812, and a belt clip 814. In some embodiments, the battery 810 may be a coin-shaped battery. In other embodiments, the battery may comprise a AAA battery or any other small rechargeable battery.

The audio port 812 may provide audio input and output for a headset. In some embodiments, the wireless portable mini-POTS device includes a built-in speaker system and a built-in microphone. In other embodiments, a headset is used to communicate via the audio port 812. The belt clip 814 is attached to the housing of the wireless portable mini-POTS device 800 and provides the ability to clip the wireless portable mini-POTS device 800 to, for example, a shirt or pants while talking via a headset connected via the audio port 812.

Figure 8B:
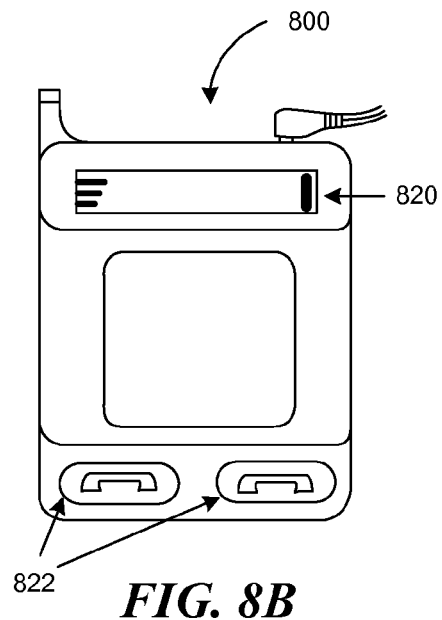

The example of FIG. 8B illustrates a front side view of the wireless portable mini-POTS device 800, according to an embodiment. The wireless portable mini-POTS device 800 includes a display 820 and control buttons 822. In some embodiments, the display may be, for example, a liquid crystal blue light display configured to display call status information including user input. In some embodiments, the control buttons 822 may be used to answer an incoming call when pressed, to dial a number entered into the keypad, as an indication that the wireless portable mini-POTS device 800 is charging, etc.

Figure 8C:
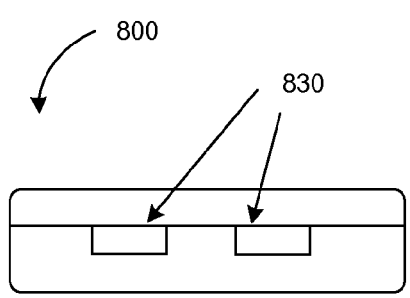

The example of FIG. 8C illustrates a bottom view of the wireless portable mini-POTS device 800, according to an embodiment. In some embodiments, the wireless portable mini-POTS device 800 includes charging contacts 830 configured to receive power from a portable wireless telephone docking system such as base station 730 of FIG. 7, when docked.

Figure 8D:
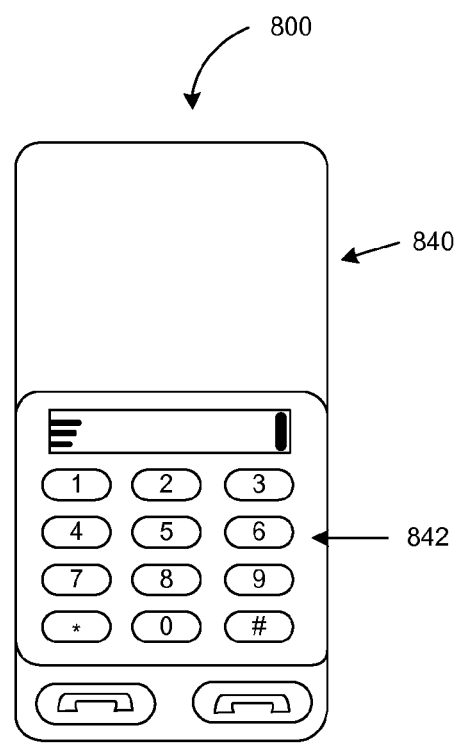

The example of FIG. 8D illustrates another front view of the wireless portable mini-POTS device 800, according to an embodiment. The wireless portable mini-POTS device 800 includes a flip top 840 and a keypad 842. The flip top 804 is configured to preserve keypad 842 and prevent unwanted key entries when, for example, the wireless portable mini-POTS device 800 is clipped onto clothing or in a pocket. The keypad 842 includes a plurality of keys disposed on the housing and is configured to receive user input via the plurality of keys.

Figure 9:
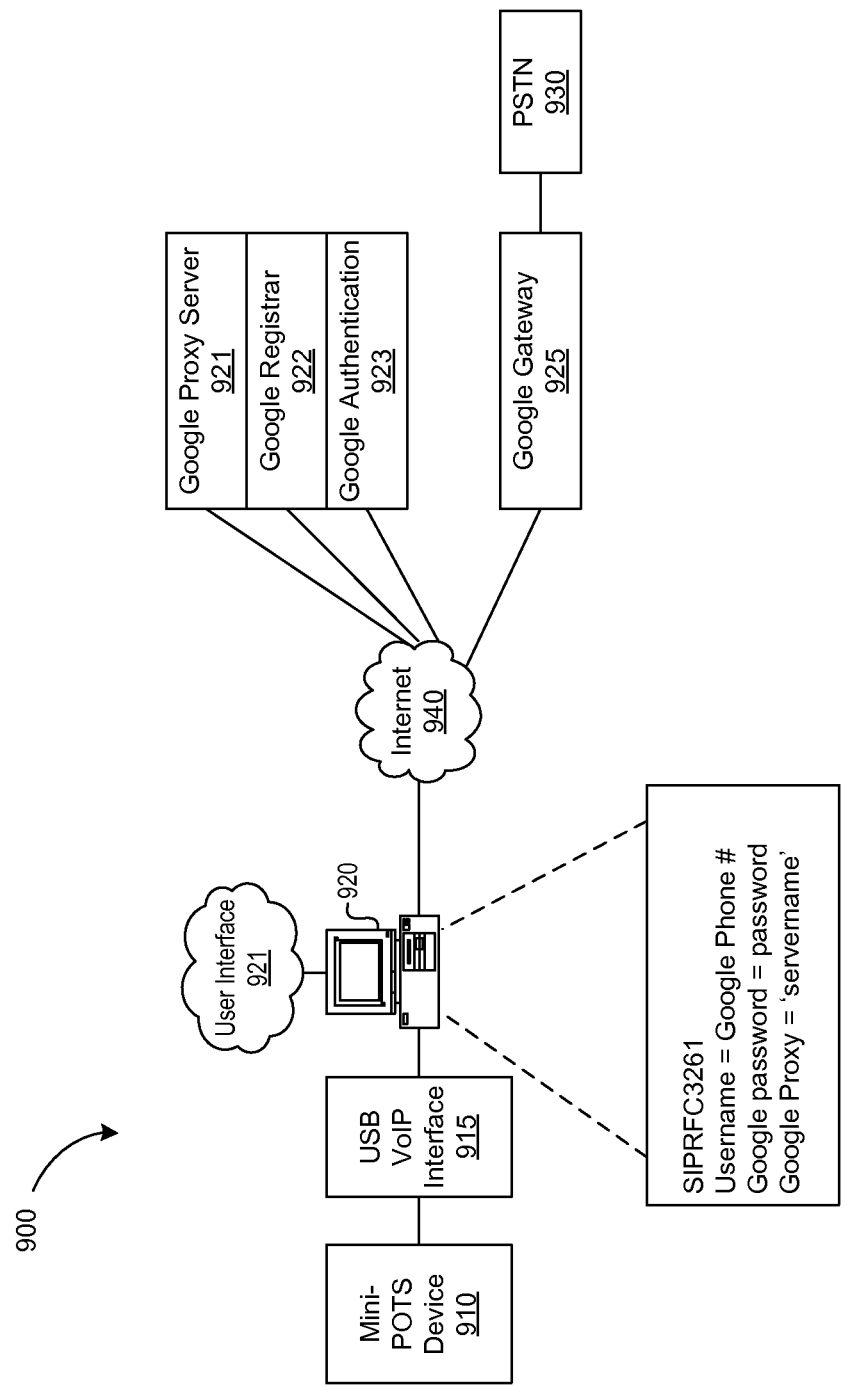
FIG. 9 depicts a block diagram of a network configuration suitable enabling communications between a POTS device and a packet data network.

FIG. 9 depicts a block diagram of a network configuration 900 suitable for enabling communications between a POTS device and a packet data network, according to an embodiment. In particular, the network configuration 900 illustrates an example network configuration suitable for enabling communications between mini-POTS device 910 and Google gateway 925, whereby Google is the VoIP service provider. The ISP is not shown for simplicity. The host system 920 connects via an ISP to the Google network to use Google as the selected VoIP service provider. The Google proxy server 921, Google Registrar 922, and Google Authentication 923 aid in establishing and carrying out the VoIP service.

In the example of FIG. 9, USB VoIP 915 transfers instructions to host system 920 when connected to the host system 920. When executed, the instructions direct the host system 920 to operate as described herein. In particular, when executed, the instructions direct the host system to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information.

Figure 10:
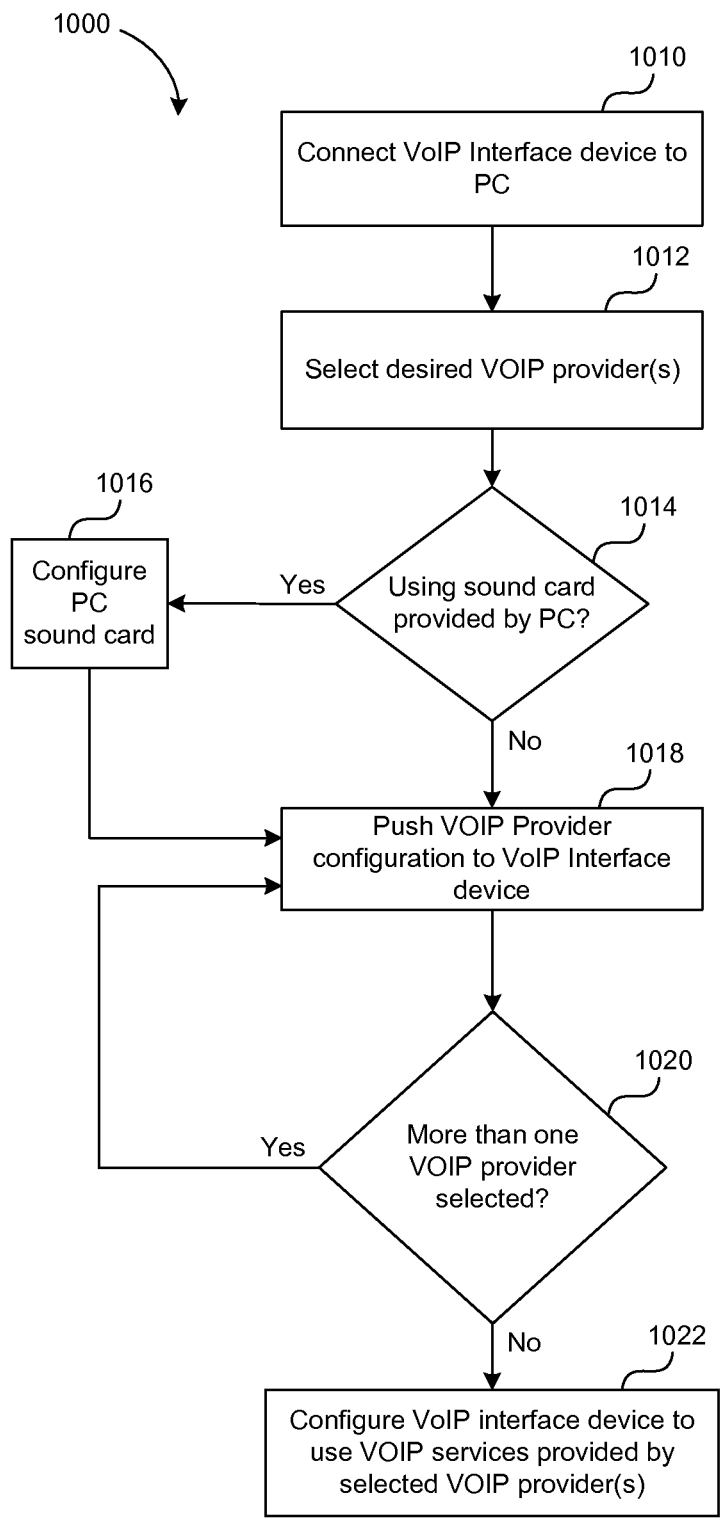
FIG. 10 depicts a flow diagram illustrating an example process for selecting one or more VoIP service provider profiles for enabling communications between a POTS device and a packet data network.

FIG. 10 depicts a flow diagram illustrating an example process 1000 for selecting one or more VoIP service provider profiles for enabling communications between a POTS device and a packet data network, according to an embodiment. The flow diagram is discussed with reference to elements of the network configuration 100 of FIG. 1. In particular, the process 1000 may be performed by the VoIP interface 115 and/or a host system 120. Alternatively, the process 1000 may be performed by the VoIP interface 115 and/or home gateway 125.

In process 1010, the VoIP interface system 115 connects to the host system 120. As previously described, the VoIP interface system 115 can connect to the host system 120 via an interface, which may utilize a physical connection, such as a USB wire, or the interface may utilize a wireless connection, such as WiFi, 802.11, infra-red or Bluetooth. Once the VoIP interface system 115 is connected to the host system 120, the host system 120 can automatically detect the VoIP interface system 115 and display, at a menu provided by the host system 120, a list of VoIP service providers 150a-n.

In process 1012, the user can select, at the menu provided by the host system 120, one or more of the VoIP service providers to utilize their VoIP services. In process 1014, the host system 120 optionally determines whether a sound card of the host system 120 will be utilized for VoIP calls. For example, a user can use a laptop's speaker and microphone instead of utilizing a separate telephone. If it is determined the sound card of the host system 120 will be utilized for VoIP services, the sound card is configured by the host system 120, at process 1016. Configuring the sound card may involve the host system 120 configuring device drivers used to operate the sound card.

In process 1018, the host system 120 pushes profile data associated with the selected VoIP service providers 150a-n to the VoIP interface system 105. Profiles can be communicated from the host system 120 to the VoIP interface system 115 via the connection interface. In process 1020, if more than one VoIP service provider is selected at the host system 120, the additional VoIP service provider profiles are pushed to the VoIP interface system 115. Lastly, in process 1022, the VoIP interface system 115 receives the profile data and configures the VoIP interface system to operate on each of the selected VoIP service providers' networks.

Figure 11:
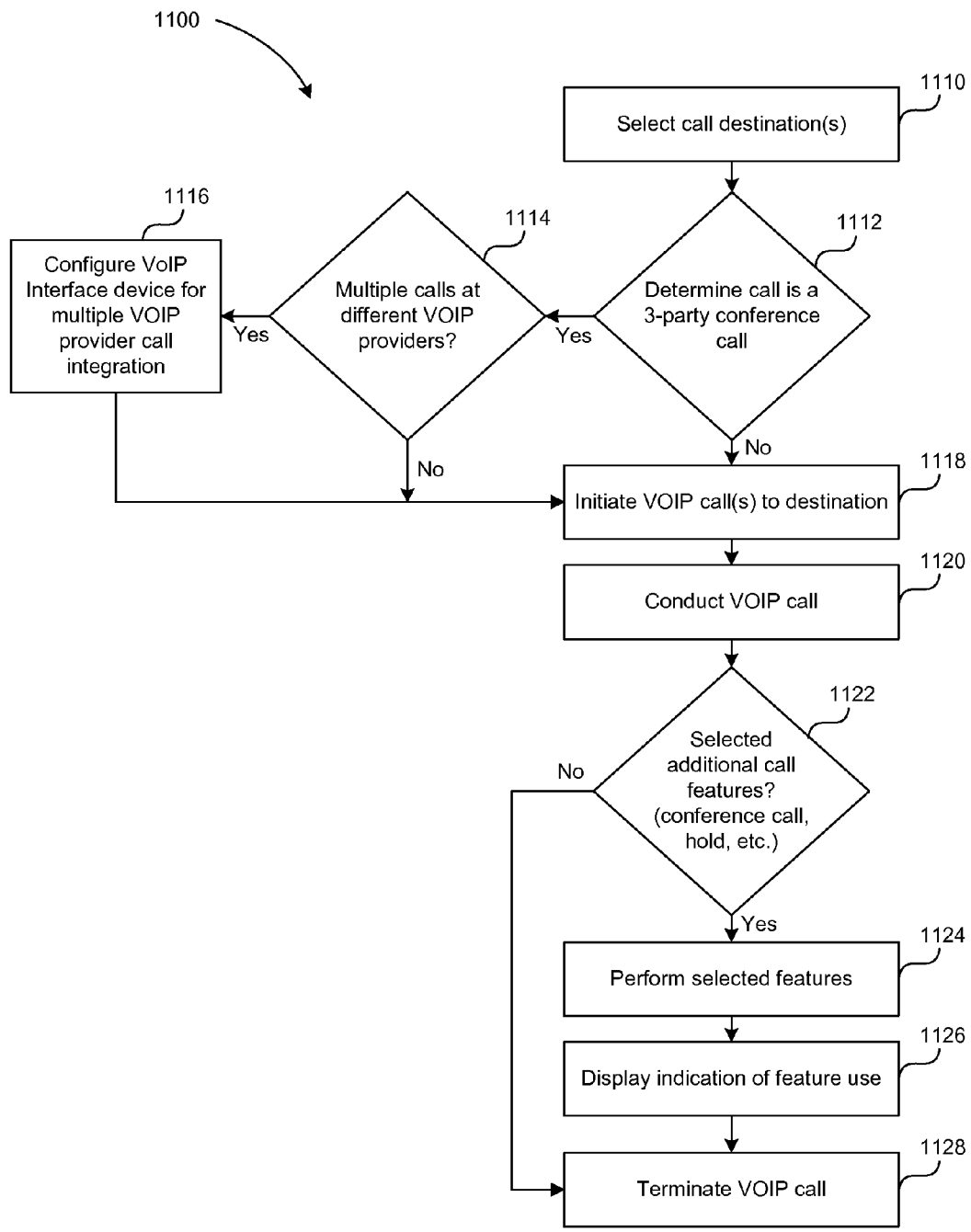
FIG. 11 depicts a flow diagram illustrating an example process for placing a call utilizing one or more of the VoIP service providers' networks.

FIG. 11 depicts a flow diagram illustrating an example process 1100 for placing a call utilizing one or more of the VoIP service providers' networks, according to an embodiment. The flow diagram is discussed with reference to elements of the network configuration 100 of FIG. 1. In particular, the process 1100 may be performed by the VoIP interface 115 and/or a host system 120. Alternatively, the process 1100 may be performed by the VoIP interface 115 and/or home gateway 125.

In process 1110, a user selects a destination user to call at a POTS device such as, for example, mini-POTS device 110. In process 1112, the VoIP interface 115 determines if more than one destination user is selected for a conference call. If so, in process 1114 the VoIP interface 115 and/or host system 120 determines whether each destination user is at the same VoIP service provider network, in which case the flow proceeds to process 1118. However, if each destination user is at a different VoIP service provider network, then at process 1116, the VoIP interface 115 is configured for multiple VoIP service provider call integration, based on data in the profile of each VoIP service provider 150a-n, as previously described. To perform multiple VoIP service provider call integration, the VoIP interface 115 is configured to operate at each of the VoIP service provider networks, as described in FIG. 13.

In process 1118, the VoIP interface system 115 initiates a call setup to each VoIP service provider network that services a destination user. In process 1120, the call is connected between each user. In process 1122, the VoIP interface system 115 determines whether other features may be used by the users during the call. For example, other features may include, but are not limited to transferring a call, placing a user on/off hold, or conferencing in another user, etc.

In process 1124, one or more selected features are performed by the VoIP interface system 115. In process 1126, indications of feature use are optionally displayed. The visual indication of a selected feature provides feedback to the user that a feature (e.g. muting the microphone) was selected, and provides the status of the operation of the selected feature (e.g. an indication displayed that visually informs the user that the microphone is disabled/enabled). Lastly, in process 1128, the call is terminated.

Figure 12:
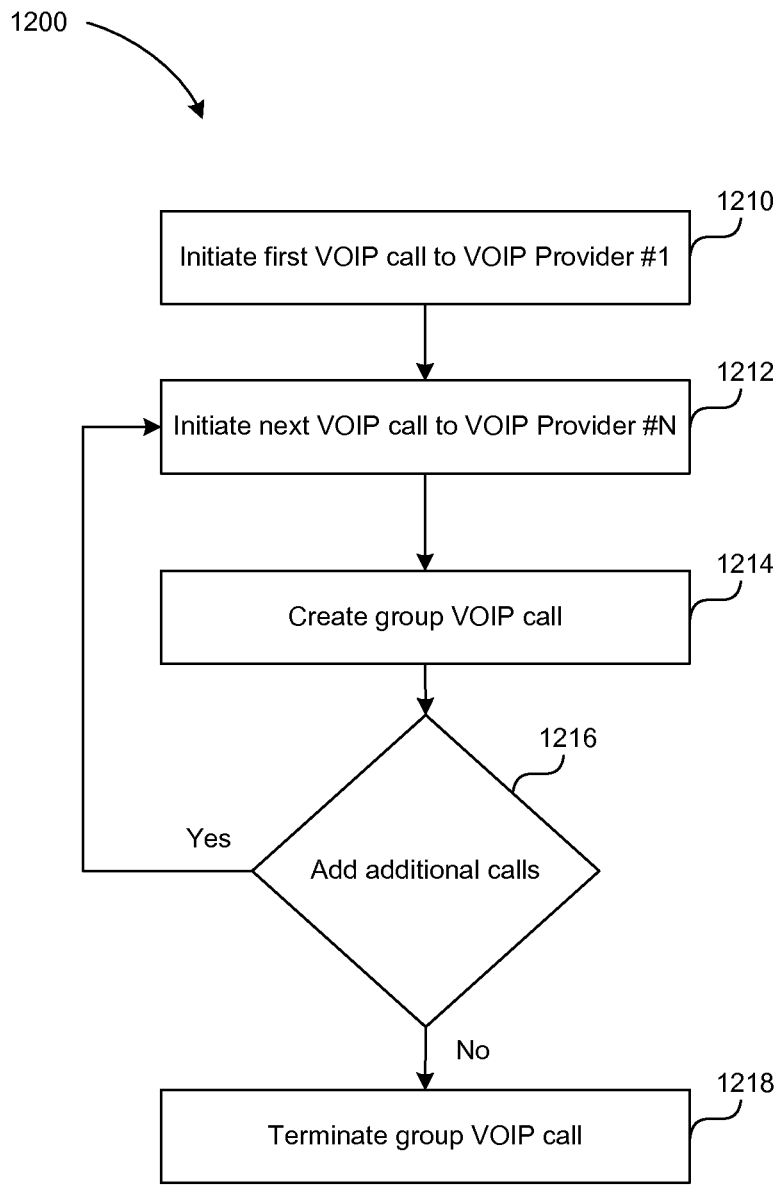
FIG. 12 depicts a flow diagram illustrating an example process for placing a 3-party conference call utilizing one or more of the VoIP service providers' networks.

FIG. 12 depicts a flow diagram illustrating an example process for placing a 3-party conference call utilizing one or more of the VoIP service providers' networks, according to an embodiment. The flow diagram is discussed with reference to elements of the network configuration 100 of FIG. 1. In particular, the process 1200 may be performed by the VoIP interface 115 and/or a host system 120. Alternatively, the process 1200 may be performed by the VoIP interface 115 and/or home gateway 125.

In process 1210, a first call is initiated by the VoIP interface systems 115 to a user at a first VoIP service provider's 150 network. In process 1212, a second call is initiated by the VoIP interface system 115 to a user at a second VoIP service provider's 150 network. Each call to each separate user is integrated into a single grouped call by the VoIP interface system 115, at process 1214. The users can then conference simultaneously and irrespectively of the users' VoIP service provider(s). In process 1216, the VoIP interface system 115 can determine if the user adds another call to the grouped call, and if so, the flow returns to process 1212. Otherwise, the flow continues to step 1318, where the grouped call is terminated upon completion.

Figure 13:
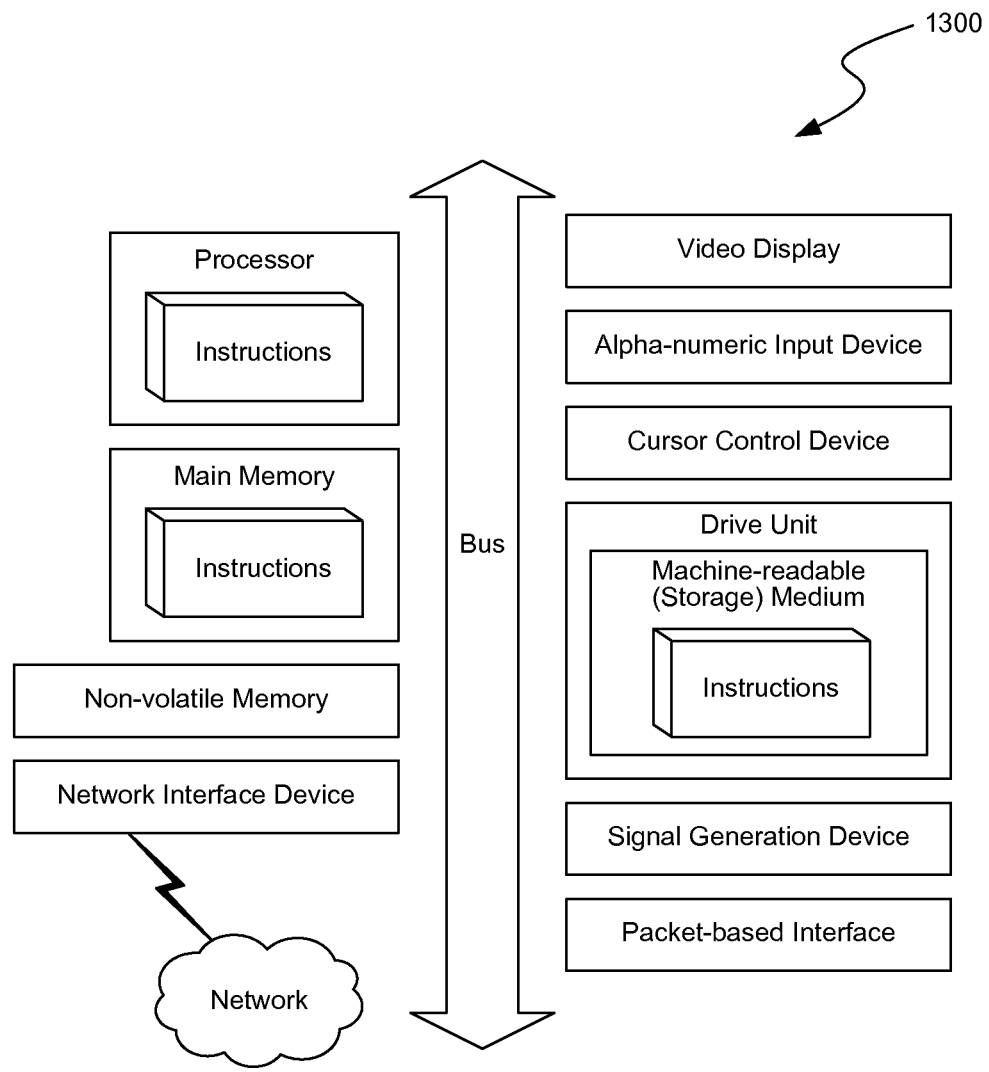
FIG. 13 shows a diagrammatic representation of a machine in the example form of a host system within which a set of instructions, for causing the host system to perform any one or more of the methodologies discussed herein, may be executed.

FIG. 13 shows a diagrammatic representation of a machine in the example form of a computer system 1300 within which a set of instructions, for causing the machine to perform any one or more of the methodologies discussed herein, may be executed.

In alternative embodiments, the machine operates as a standalone device or may be connected (e.g., networked) to other machines. In a networked deployment, the machine may operate in the capacity of a server or a client machine in a client-server network environment, or as a peer machine in a peer-to-peer (or distributed) network environment.

The machine may be a server computer, a client computer, a personal computer (PC), a tablet PC, a set-top box (STB), a personal digital assistant (PDA), a cellular telephone, a web appliance, a network router, switch or bridge, or any machine capable of executing a set of instructions (sequential or otherwise) that specify actions to be taken by that machine.

While the machine-readable (storage) medium is shown in an exemplary embodiment to be a single medium, the term "machine-readable (storage) medium" should be taken to include a single medium or multiple media (e.g., a centralized or distributed database, and/or associated caches and servers) that store the one or more sets of instructions. The term "machine-readable medium" or "machine readable storage medium" shall also be taken to include any medium that is capable of storing, encoding or carrying a set of instructions for execution by the machine and that cause the machine to perform any one or more of the methodologies of the present invention.

In general, the routines executed to implement the embodiments of the disclosure, may be implemented as part of an operating system or a specific application, component, program, object, module or sequence of instructions referred to as "computer programs." The computer programs typically comprise one or more instructions set at various times in various memory and storage devices in a computer, and that, when read and executed by one or more processors in a computer, cause the computer to perform operations to execute elements involving the various aspects of the disclosure.

Moreover, while embodiments have been described in the context of fully functioning computers and computer systems, those skilled in the art will appreciate that the various embodiments are capable of being distributed as a program product in a variety of forms, and that the disclosure applies equally regardless of the particular type of machine or computer-readable media used to actually effect the distribution.

Further examples of machine or computer-readable media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

Unless the context clearly requires otherwise, throughout the description and the claims, the words "comprise," "comprising," and the like are to be construed in an inclusive sense, as opposed to an exclusive or exhaustive sense; that is to say, in the sense of "including, but not limited to." As used herein, the terms "connected," "coupled," or any variant thereof, means any connection or coupling, either direct or indirect, between two or more elements; the coupling of connection between the elements can be physical, logical, or a combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, and any combination of the items in the list.

The above detailed description of embodiments of the disclosure is not intended to be exhaustive or to limit the teachings to the precise form disclosed above. While specific embodiments of, and examples for, the disclosure are described above for illustrative purposes, various equivalent modifications are possible within the scope of the disclosure, as those skilled in the relevant art will recognize. For example, while processes or blocks are presented in a given order, alternative embodiments may perform routines having steps, or employ systems having blocks, in a different order, and some processes or blocks may be deleted, moved, added, subdivided, combined, and/or modified to provide alternative or subcombinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other systems, not necessarily the system described above. The elements and acts of the various embodiments described above can be combined to provide further embodiments.

Any patents and applications and other references noted above, including any that may be listed in accompanying filing papers, are incorporated herein by reference. Aspects of the disclosure can be modified, if necessary, to employ the systems, functions, and concepts of the various references described above to provide yet further embodiments of the disclosure.

These and other changes can be made to the disclosure in light of the above Detailed Description. While the above description describes certain embodiments of the disclosure, and describes the best mode contemplated, no matter how detailed the above appears in text, the teachings can be practiced in many ways. Details of the system may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific embodiments disclosed in the specification, unless the above Detailed Description section explicitly defines such terms. Accordingly, the actual scope of the disclosure encompasses not only the disclosed embodiments, but also all equivalent ways of practicing or implementing the disclosure under the claims.

While certain aspects of the disclosure are presented below in certain claim forms, the inventors contemplate the various aspects of the disclosure in any number of claim forms. For example, while only one aspect of the disclosure is recited as a means-plus-function claim under 35 U.S.C. §112, ¶6, other aspects may likewise be embodied as a means-plus-function claim, or in other forms, such as being embodied in a computer-readable medium. (Any claims intended to be treated under 35 U.S.C. §112, ¶6 will begin with the words "means for".) Accordingly, the applicant reserves the right to add additional claims after filing the application to pursue such additional claim forms for other aspects of the disclosure.

What is claimed is:

1. A Voice over Internet Protocol (VoIP) interface system for enabling communications between a plain old telephone service (POTS) device and a packet data network, the VoIP interface system comprising:

a POTS interface configured to communicate POTS two-way voice telephone communications with the POTS device;

a powered packet-based interface configured to be coupled to a host computer system, separate from the VoIP interface system, to establish packet-based two-way voice telephone communications with a packet-based computer network through the host computer system and receive power for the VoIP interface system from the host computer system;

a memory system located on the VoIP interface system and configured to store a set of instructions, wherein when executed by the host computer system, the set of instructions direct the host computer system to prompt the user for a selection from a plurality of VoIP service providers, receive a selection identifying one of the plurality of VoIP service providers, identify profile information associated with the user and the selected one of the VoIP service providers, and populate one or more fields of a Session Initiation Protocol (SIP) module based on the profile information, wherein the set of instructions is transferred from the memory system to the host computer system via the packet-based interface before the execution and wherein the set of instructions transferred to the host computer system includes the plurality of VoIP service providers for the user to select;

electronic circuitry communicatively coupled to the POTS interface, the powered packet-based interface, and the memory system, the electronic circuitry configured to convert the POTS two-way voice communications to packet-based voice communications and the packet-based voice communications to POTS voice communications; and wherein the set of instructions, when executed by the host computer system, further directs the host computer system to receive another selection, from the user, identifying another VoIP service provider and to push profile information of at least the selected two of the VoIP service providers back to the VoIP interface system, and wherein the electronic circuitry, in response to receiving the profile information, is configured to conference simultaneously over the selected two of the VoIP service providers by converting data received through the powered packet-based interface and the POTS interface and performing multiple VoIP service provider call integration based on the profile information.

2. A Voice over Internet Protocol (VoIP) interface system for enabling communications between a plain old telephone service (POTS) device and a packet data network, the VoIP interface system comprising:

a POTS interface configured to communicate POTS two-way voice telephone communications with the POTS device;

a packet-based interface configured to be coupled to a host computer system, separate from the VoIP interface system, to establish packet-based two-way voice telephone communications with a packet-based computer network through the host computer system;

a power adapter configured to provide power to the VoIP interface system;

a memory system located on the VoIP interface system and configured to store a set of instructions, wherein when executed by the host computer system, the set of instructions direct the host computer system to prompt the user for a selection from a plurality of VoIP service providers, receive a selection identifying one of the plurality of VoIP service providers, identify profile information associated with the user and the selected one of the plurality of VoIP service providers, and populate a plurality of fields of a Session Initiation Protocol (SIP) module based on the profile information, wherein the set of instructions is transferred from the memory system to the host computer system via the packet-based interface before the execution and wherein the set of instructions transferred to the host computer system includes the plurality of VoIP service providers for the user to select;

electronic circuitry communicatively coupled to the POTS interface, the packet-based interface, and the memory system, the electronic circuitry configured to convert the POTS two-way voice communications to packet-based voice communications and the packet-based voice communications to POTS voice communications; and wherein the set of instructions, when executed by the host computer system, further directs the host computer system to receive another selection, from the user, identifying another VoIP service provider and to push profile information of at least the selected two of the VoIP service providers back to the VoIP interface system, and wherein the electronic circuitry, in response to receiving the profile information, is configured to conference simultaneously over the selected two of the VoIP service providers by converting data received through the powered packet-based interface and the POTS interface and performing multiple VoIP service provider call integration based on the profile information.

* * * * *